(12) United States Patent  (10) Patent No.: US 9,266,573 B2
Blake  (45) Date of Patent: Feb. 23, 2016

(54) SUPPORT STAND FOR A BICYCLE

(76) Inventor: Garrett B. Blake, Chapel Hill, NC (US)

( * ) Notice: Subject to any disclaimer, the term of this patent is extended or adjusted under 35 U.S.C. 154(b) by 156 days.

(21) Appl. No.: 13/980,852

(22) PCT Filed: Feb. 28, 2012

(86) PCT No.: PCT/US2012/026940
§ 371 (c)(1),
(2), (4) Date: Jul. 19, 2013

(87) PCT Pub. No.: WO2012/118804
PCT Pub. Date: Sep. 7, 2012

(65) Prior Publication Data
US 2013/0291364 A1    Nov. 7, 2013

Related U.S. Application Data

(60) Provisional application No. 61/448,197, filed on Mar. 2, 2011.

(51) Int. Cl.
*B62H 1/06* (2006.01)
*B62H 1/00* (2006.01)

(52) U.S. Cl.
CPC .. *B62H 1/00* (2013.01); *B62H 1/06* (2013.01); *Y10T 29/4987* (2015.01); *Y10T 29/49815* (2015.01); *Y10T 29/49826* (2015.01); *Y10T 29/49876* (2015.01); *Y10T 29/49904* (2015.01); *Y10T 29/53843* (2015.01); *Y10T 29/53917* (2015.01); *Y10T 29/53961* (2015.01)

(58) Field of Classification Search
CPC ...... B62H 1/00; B62H 1/06; Y10T 29/49826; Y10T 29/49876; Y10T 29/4987; Y10T 29/49904; Y10T 29/49815; Y10T 29/53843; Y10T 29/53917; Y10T 29/53961
See application file for complete search history.

(56) References Cited

U.S. PATENT DOCUMENTS

| 4,591,180 | A | 5/1986 | Copple |
| 7,516,973 | B2 | 4/2009 | Mielke |
| 8,899,135 | B2 * | 12/2014 | Frank et al. ............ 82/1.2 |
| 2006/0061061 | A1 | 3/2006 | Chuang |
| 2006/0110212 | A1 | 5/2006 | Masui |

FOREIGN PATENT DOCUMENTS

EP    2128005 B1    12/2009

OTHER PUBLICATIONS

International Search Report dated Sep. 27, 2012 received in International Patent Application PCT/US2012/026940.

* cited by examiner

*Primary Examiner* — John C Hong
(74) *Attorney, Agent, or Firm* — Z IP Law PLLC; Claire Zopf

(57) ABSTRACT

A bicycle support stand for supporting a bicycle or other similar generally wheeled transportation apparatus or vehicle having substantially linear and separable or retractable portions which are removably secured to a mating tab portion positioned adjacent to or about an axle, or axle skewer, of a bicycle wheel. The support stand is specifically designed to accommodate bicycles having a frame geometry which cannot incorporate a conventional kickstand.

14 Claims, 2 Drawing Sheets

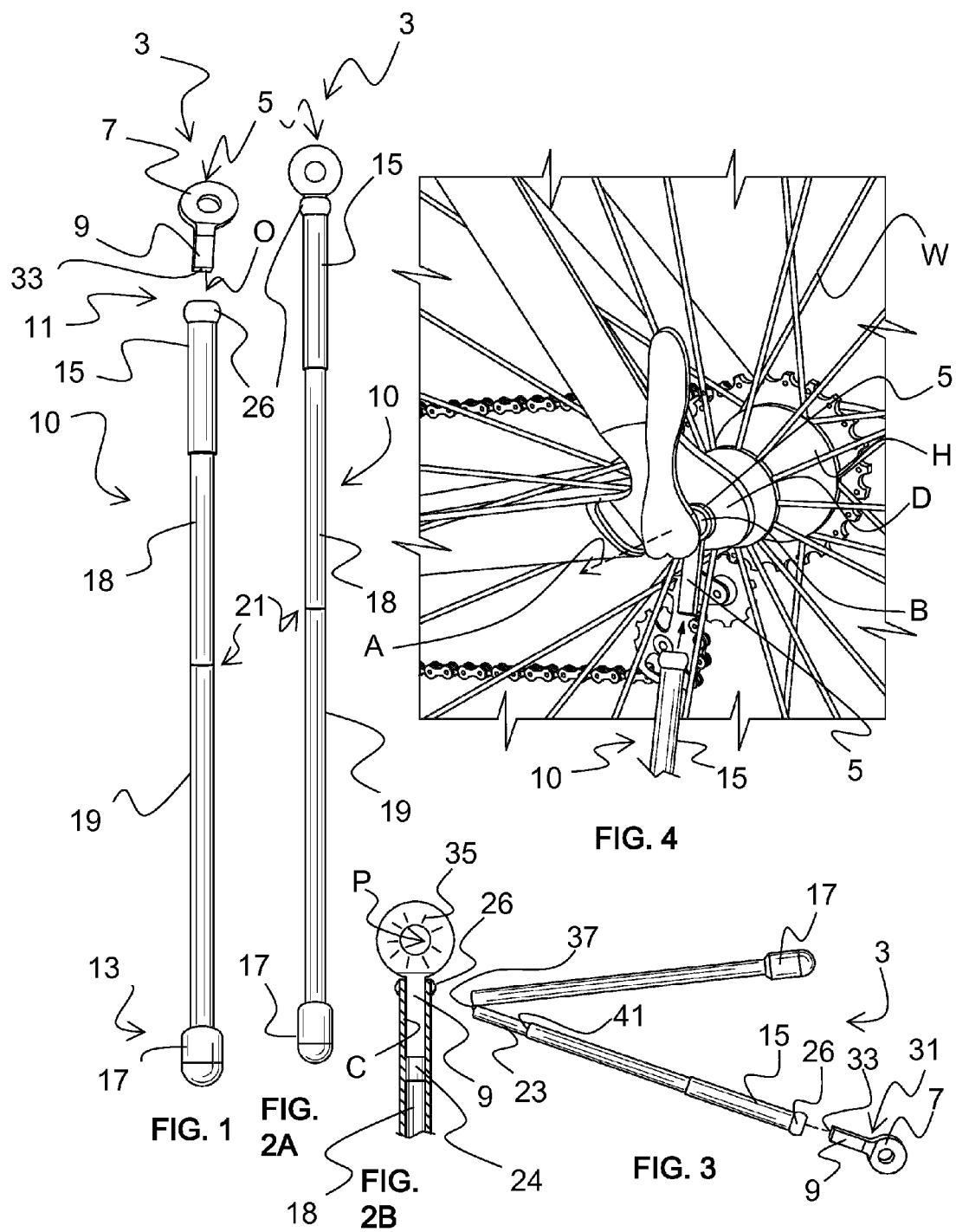

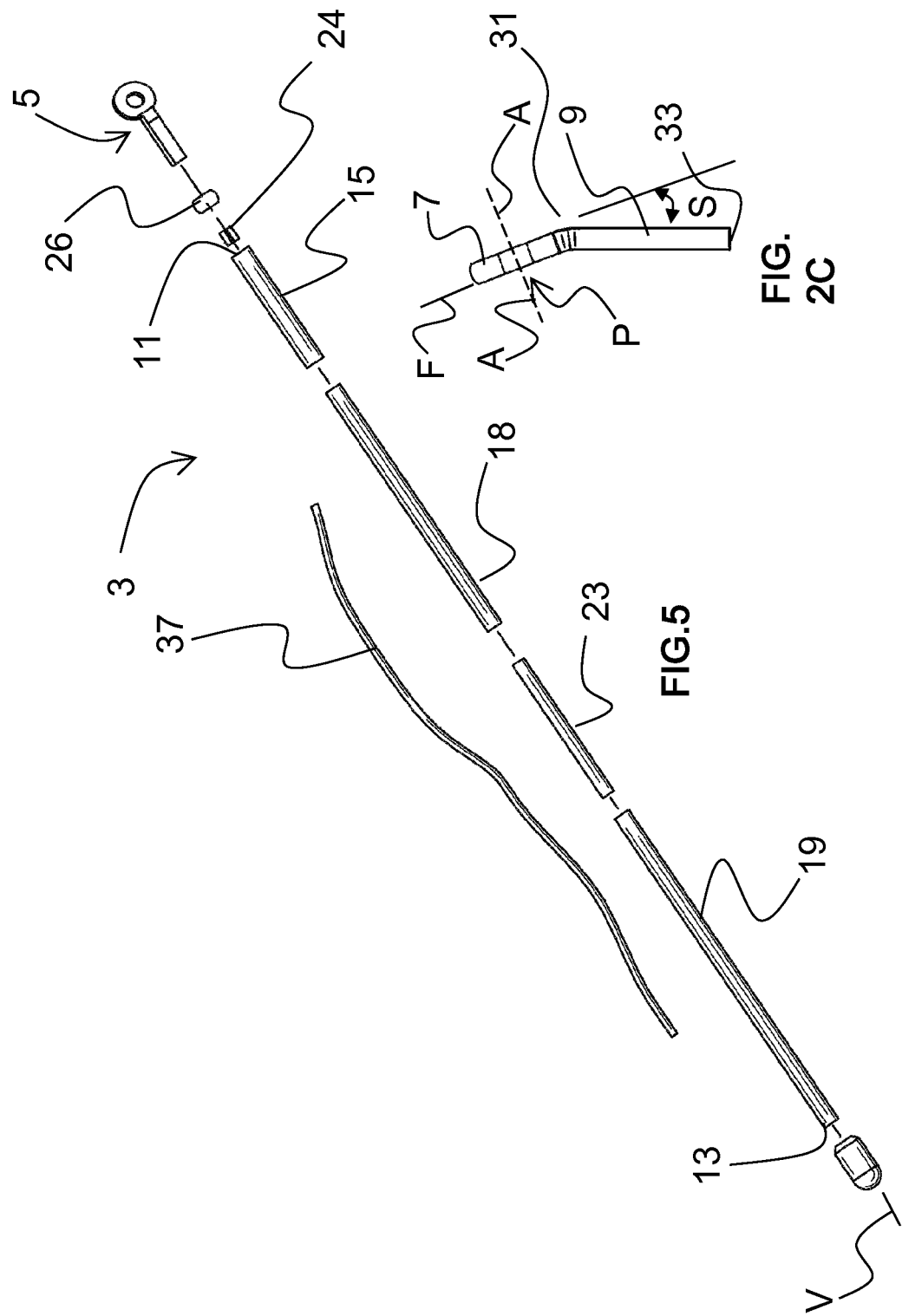

SUPPORT STAND FOR A BICYCLE

This application claims the benefit of U.S. Provisional Application No. 61/448,197 filed Mar. 2, 2011 and entitled KICK STAND, which is hereby incorporated herein by reference in its entirety.

FIELD OF THE INVENTION

The present invention relates to a novel bicycle support stand for supporting a bicycle or other similar generally wheeled transportation apparatus or vehicle. More particularly, the support stand is provided with substantially linear and separable, or retractable, portions which are removably secured to a mating tab positioned adjacent to or about an axle, or axle skewer, of a bicycle wheel. The support stand of the present invention is specifically of importance for bicycles having a frame geometry which cannot incorporate a conventional kickstand.

BACKGROUND OF THE INVENTION

Growth of the bicycle industry has produced exciting and new bicycles for example in both the mountain bike, and road racing fields as well as designs specifically for sprinting and for triathlon events. With new materials and advancing manufacturing technologies now available for manufacturing bicycle frames, new bicycle frames are often incompatible with the known conventional kickstands which support a bike by attachment of the kickstand adjacent the cranks and bottom bracket of a conventional bicycle. As is known in the art, a conventional kickstand has a mounting plate which is bolted or affixed in one manner or another between the rear chain stays of the bicycle frame in the middle of the bike frame adjacent the bottom bracket of the frame. A one piece elongate extension is springably hinged to the mounting plate and can be manually moved, i.e. usually by kicking with the foot, relative to the mounting plate and bicycle frame between a supporting position for engaging the ground and supporting the bicycle in an upright manner, and a stowed position, where the rod or tube retracts and rotates about the spring hinge to lie substantially parallel and slightly spaced from the rear chain stays. As such conventional kickstands are known, no further description is provided in this regard.

Many new bicycle frames for example carbon fiber frames do not have such a conventional rear chain stay design and thus cannot support these conventionally known kickstands. The most distinctive feature of such new bicycle frames are their unique geometry, size, tubing types, welding or glue methods, design integrity, fit, flex and rigidity, weight and cable routing. Because of the geometry size and tubing types there are many variables which go into a modern frame. There are different types of tubing to be used for the frame for example steel, aluminum, titanium, carbon fiber and plastic. Each type of tubing has its own advantages and disadvantages. The choice of tubing type will end on the particular needs of the rider. Furthermore, in mountain biking, road racing, sprint races and triathlons, lowering the weight of the overall bicycle by foregoing a kickstand is a significant consideration. Also, such conventional kickstands are on one hand considered by racers and triathletes as entirely uncool, and more importantly on the other hand can interfere with operation of the bicycle function especially in extreme racing conditions and rough environments.

Due to the nature of bicycle racing, triathlons and mountain biking events for example where lower weight and strict functionality are demanded by athletes, conventional kickstands are not a basic feature of many contemporary bicycles. As a result most, if not all new bikes are made and sold without a kickstand or other type of independent supporting mechanism that can support the bicycle in an upright position. However these bikes tend to be fairly expensive and without a kickstand a user must support their bicycle against a tree, fence or a car for example in many instances. Often this is a precarious situation so the user lays the bicycle on the ground where it is a hazard to others, can get dirty or be damaged. In the absence of a kickstand, there is no simple, safe way to support a bicycle in the absence of a dedicated work stand or bicycle rack however these things are not always readily available when one dismounts the bike.

U.S. Pat. No. 4,591,180 to Coppel shows a portable bicycle stand for supporting a bicycle. The stand is designed to permit its removal from the bicycle when not in use. The bicycle stand includes an elongated support leg having at a first end a cooperating finger and thumb adapted to detachably mount the support leg to the bicycle frame in a support position wherein a second opposite end of the support leg engages the ground to support the bicycle in a generally upright orientation. Intermediate its first and second ends, the support leg further has a pair of aligned storage facilitating arms which, in cooperation with the support leg itself, are adapted to detachably mount the support leg on the bicycle frame in a second storage position. The drawbacks with this apparatus are that it can only be used on a conventional frame geometry having a pair of rear chain stays adjacent the bicycle cranks and bottom bracket and also that the storage position on the frame is a highly unsecure position. Advances in bicycle construction including material composites, tubing shapes, and frame designs have rendered the Coppel design incompatible with many modern bicycles. Further, none of the known references disclose a support stand for a bicycle wherein the support can be effectively and securely magnetically attached and easily detached, collapsed and stored when the bike is placed into use.

OBJECTS AND SUMMARY OF THE INVENTION

The first object of the present invention is to provide an easy to use lightweight and detachable support stand for a bicycle.

Another object of the present invention is to provide an economical add-on support stand apparatus that can be added to any bicycle no matter the type or style of frame geometry of the bicycle.

A still further object of the present invention is to provide a bicycle support which can be easily removed and also collapsed into sufficiently small-sized article which can be stowed in a rider's jersey pocket or gear bag.

A yet still further object of the present invention to provide for the magnetic attachment and detachment of the support stand to a lightweight tab element mounted on the rear axle of the bicycle.

The present invention relates to a bicycle support stand having a tubular elongated body which attaches to a tab fixed on or around the axle of a bicycle and the tab and body are attached via a magnetic coupling which facilitates the retention of the body of the support stand on the receiver in a desired position for supporting the bicycle. The magnetic coupling also facilitates manual attachment and detachment of the tab and the body so that the support stand can be easily attached and detached from the bicycle when desired. Also, the support stand body may be formed in multiple connectable portions so that the body can be broken down into smaller length sections and where the smaller length sections may be connected by a spring element such as an elastic cord, the body of the support stand can be easily stored and folded up into a smaller form for storage into a small pack pocket or gear bag and then quickly and easily reassembled into a full length body portion of the support stand.

The present invention also relates to a support stand for a wheeled vehicle comprising a tab having a stem and an axle surround for connection about a rotational axis of a wheel, an elongate body comprising an upper portion separably connectable and disconnectable from a lower portion, a receiver connected to the upper portion of the elongate body defining a cavity for receiving the stem of the tab, an attached state wherein the tab is connected about the rotational axis of a wheel and the upper and lower portions of the elongate body are connected and the stem of the tab is received within the cavity of the receiver, and a detached state wherein the stem of the tab is withdrawn from the cavity of the receiver and the wheeled vehicle is not supported by the support stand.

The invention also relates to a support stand for a wheeled vehicle comprising a tab having an axle surround for connection about a rotational axis of a wheel, an elongate body comprising an upper portion separably connectable and disconnectable from a lower portion, a connection element on the upper portion of the elongate body for connecting to the tab, an attached state wherein the tab is connected about the rotational axis of a wheel and the upper and lower portions of the elongate body are connected to the tab by the connection element to support the wheeled vehicle, and a detached state wherein the body is detached from the tab and the wheeled vehicle is not supported by the support stand.

The invention also relates to a method of supporting a wheeled vehicle comprising the steps of fabricating a tab having an axle surround for connection about a rotational axis of a wheel, providing an elongate body having an upper portion separably connectable and disconnectable from a lower portion and a connection element on the upper portion of the elongate body for connecting to the tab, connecting the tab about the rotational axis of a wheel in an attached state and connecting the upper and lower portions of the elongate body to the tab by the connection element to support the wheeled vehicle, and defining a detached state wherein the body is detached from the tab and the wheeled vehicle is not supported by the support stand.

In a preferred embodiment of the invention the tab and the body of the support stand are connected via a combination of a friction fit and magnetic attraction which facilitates simple manual removal of the body from the tab when not in use. Also in a preferred embodiment, the body of the support stand is formed in at least a two separate pieces connectable by a telescoping fit with one another and by a spring or elastic member extending between the two body portions and which maintains a desired spring force along a common axis of the connected pieces of the body thereby retaining the two items together in the desired and secure telescopic manner, as well as permitting the detachment of the first and second portions from one another where the elastic member retains the two pieces together in some form, and hence facilitates storage in a smaller form.

These and other features, advantages and improvements according to this invention will be better understood by reference to the following detailed description and accompanying drawings.

BRIEF DESCRIPTION OF THE DRAWINGS

Several embodiments of the present invention will now be described by way of example only, with reference to the accompanying drawings in which:

FIG. 1 is a planar view of a first embodiment of the support stand in a disconnected state with the tab element;

FIG. 2A is a planar view of the first embodiment of the support stand in a connected state with the tab element;

FIG. 2B is a cross-sectional view of the receiver part of the first embodiment of the support stand of the present invention;

FIG. 2C is a side elevation view of the tab of the first embodiment of the support stand;

FIG. 3 is a planar view of the first embodiment of the support stand and tab in the disconnected state and the body of the support stand being disassembled;

FIG. 4 is a perspective view of a rear wheel axle of a bicycle and the rear portion of the bicycle frame to which the receiving portion of the first embodiment of the support stand is shown affixed about a rear axle skewer; and FIG. 5 is an exploded view of one embodiment of the body portion of the first embodiment of the support stand.

DETAIL DESCRIPTION OF THE PREFERRED EMBODIMENT

The present invention discloses a bicycle support stand 3 as generally shown in FIG. 1. The support stand 3 includes essentially two connectable main elements, a tab 5 connected directly to the bicycle and an elongated, generally tubular body 10 which is capable of attachment and detachment from the tab 5. The tab 5 includes an axle surround 7 portion for connection of the tab 5 circumferentially around the axle, or axle skewer, and axially along a rotational axis A of the bicycle wheel W, and an integral stem 9 for attachment and detachment with the body 10 of the support stand 3. The body 10 of the support stand 3 has a first end 11 and a second end 13 defining a substantially hollow passage therebetween along the length of the body 10. The first end 11 of the support stand 3 is provided with a receiver 15 defining an opening O leading to a cavity for receiving the stem 9 portion of the tab 5 and directly supporting the bicycle when the tab 5 is appropriately connected with the bicycle. The second end 13 of the body 10 may be provided with a ground engaging member 17 which facilitates a friction engagement between the support stand 3 and the ground.

The body 10 may be a single shaft or preferably a plurality of separate and inter-connectable sections. In an embodiment shown in FIG. 1, the body 10 includes an upper portion 18 and a lower portion 19 which are manually inter-connectable with one another at an intermediate point of the body 10. As seen in FIGS. 1, 2A and 3 the upper and lower portions 18, 19 can be interconnected by an intermediate connector 23 portion to support the bicycle in a supported state, and conversely can be disconnected with one another when necessary and concurrently removably separated from the tab 5 and bicycle to be stowed, stored or packed away in a compact manner (as best shown in FIG. 3.) The upper and lower portions 18, 19 of the body 10 can be connected together in known arrangements of connecting similar sized tubing, but in one embodiment of the support stand 3 as discussed in further detail below, one of the upper and lower portions 18, 19 may have a reduced diameter portion, or securely accommodate the intermediate connector 23 which fits within the inner diameter of the other upper or lower body 10 portion so as to define a telescopic connection between these elements.

Turning to FIG. 4 the tab 5 is shown attached to the bicycle without the body 10 of the support stand 3 attached thereto. The bicycle axle defines the rotational axis A through the center of the rotatable wheel hub H and about which the wheel rotates. Generally, the axle surround 7 part of the tab 5 is secured between a quick release skewer bolt B and the rear dropout D of the bicycle frame at a position along the axis A substantially adjacent a rear drop-out portion of the frame which supports the axle. Preferably the tab 5 is secured on the outside of the bicycle frame relative to the wheel hub H so that the tab 5 does not interfere in any manner with rotation of the bicycle wheel. It is to be appreciated that there may be other washers or axle elements axially adjacent and between the skewer bolt B and tab 5. The tab 5 itself may be made from a single piece of material, for example, steel, aluminum, plastic or other material could be used, which includes the axle surround 7 and integral stem 9 portion. The tab 5 and hence the stem 9 portion and axle surround 7 are preferably made from a single piece of material so that the tab 5 provides the necessary strength to support the bicycle, but could also be made as a multiplicity of elements as well.

In one embodiment shown in FIG. 3, the stem 9 is a male element which essentially depends from a connection point 31 with the axle surround 7 to a free end 33 spaced from the axle surround 7. The stem 9 is intended to be removably received within the receiver 15 and cavity C of the body 10 by inserting the free end 33 of the stem 9 through the opening O and into the cavity C of the receiver 15 on the support stand 3. Observing FIG. 2B the stem 9 may be of any shape or length which substantially matches that of the cavity C and receiver 15. For example the stem 9 may be 1.27 cm to 7.62 cm (0.5 to 3.0 inches) in length, but preferably about 2.54 cm to 5.08 cm (1.0 to 2.0 inches) in length and may have a round, rectangular, or hexagonal, etc. axial cross-section which generally fits the diameter of the cavity C and receiver 15 on the support body 10. In one embodiment of the present invention the stem 9 has a rectangular or square cross-section which is dimensioned to fit within a circular i.e. cylindrical cavity C. This is important because of the efficiency in manufacturing of the tab 5, and also the body 10.

To fabricate the tab 5 in a highly efficient and economical manner via a stamping or cutting procedure a single piece of common bar stock having a desired thickness may be selected as the basis for forming the tab 5. Based on a desired thickness in the range of 0.254 cm to 1.27 cm (0.1 to 0.5 inches), and more preferably about 0.508 cm to 0.635 cm (0.2 to 0.25 inches), the selected bar stock can be cut, stamped or worked in any known manner to efficiently produce the tab 5 having the desired shape and features discussed above without having to work the material to the desired thickness, which remains the same as the originally selected bar stock. Where the body 10 is selected from cylindrical tube stock of one material or another, instead of having to alter either the cavity C or the stem 9, the cross-sectional dimensions of even a square or rectangular stem 9 are chosen to fit within the inner diameter defined by the cylindrical cavity C. A rather snug and secure fit can thus be provided without having to perform any further machining, cutting or forming steps for either the receiver 15 or the stem 9.

FIG. 2B shows a cross-section of the receiver 15 connected to the upper portion 18 of the body 10. The receiver 15 is essentially hollow having an inner diameter which is essentially the same or slightly larger than the outer diameter of the upper portion 18 so that the upper portion 18 of the body 10 may be securely received and fixed inside a lower part of the interior of the receiver 15. An upper part of the interior of the receiver 15 defines the cavity C in which the stem 9 part of the tab 5 is received. The receiver 15 may be made of different materials, such as aluminum, steel, plastic, fiberglass, carbon fiber etc., and is also provided with a magnetic element 24 affixed inside the cavity C, for example against an upper most end of the upper member 18, and retained in the cavity C by glue, friction fit or other means of securing such an element as known. The magnetic element 24 has a polarity opposite, and therefore magnetically attractive, to that of the material forming the stem 9 of the tab 5. The magnetic element 24 helps secure and axially pull the stem 9 of the tab 5 down into the cavity C of the receiver 15 as a user aligns and inserts the stem 9 into the receiver 15. The magnetic element 24 facilitates retention of the support stand 3 on the tab 5 even if the bicycle is moved and the support stand 3 is no longer in contact with the ground. A guide ring 26 may be applied to the upper end of the receiving attachment to facilitate the entrance into the cavity C and to prevent premature wear of the receiver 15 depending on the material of which it is made.

As seen in FIGS. 1-3, the axle surround 7 of the tab 5 is generally a circumferential round shape having a passage P through the middle of the axle surround 7 to accommodate the axle and skewer of the bicycle wheel. The axle surround 7 is essentially a washer type element defined about the axis A, and having a front and back opposing faces between which the passage P extends along the axis A. At least one of the front and back faces may be provided with a plurality of notches or striations 35 radially surrounding an outer edge of the passage so that the face(s) are provided with a gripping surface portion for better frictional contact with any axially adjacent surface along the bicycle axle, for instance a washer, skewer bolt, rear drop-out or other frame member. This frictional contact is important as well because of the necessity to ensure the tab 5 does not rotate in any manner about the axis A despite the fact that the wheel itself and associated elements of the wheel hub H and axle may themselves be rotating at a significant angular velocity.

As shown in FIG. 2C, the stem 9 extends radially from the axle surround 7 at a desired angle S, for example 5 to 20° and more particularly 10 to 15°, from the axle surround 7 and a first face plane F of the axle surround 7 which is defined as perpendicular to the axis A. The angle S is important because while the axle surround 7 must lie essentially axially parallel with other elements along the bicycle wheel axis A, the stem 9 itself should extend relative to the axis A and the bicycle frame in a manner which will most readily support the bicycle in an upright manner when the body 10 of the support is connected to the tab 5. In the manner of manufacture of the tab 5 as described above, the additional step of forming this appropriate bend or angle S of the stem 9 is facilitated by the integral, single piece tab 5 whereby a slight bend may be formed at the connection point 31 of the stem 9 and the axle surround 7 to provide the desired stem 9 angle S. It is to be appreciated that the bend may also be formed along the length of the stem 9 at some point between the connection point 31 and the free end 33 of the stem 9.

FIG. 5 is an exploded view showing the different elements of the support stand 3 and methods of assembly and disassembly of the body 10 and the tab 5. The body 10 as described above includes an upper portion 18 and a lower portion 19 which may be made of any particular desired materials such as carbon fiber, aluminum, fiberglass, plastic, steel, etc. In one embodiment as shown, the tubular upper and lower portion 18, 19 are designed to receive the similarly hollow intermediate member 23 which has an outer diameter substantially similar to that of the inner diameter of the upper and lower portions 18, 19. The intermediate member 23 can be securely affixed, for instance by gluing, friction fit, or other known means partially within one or the other of the upper and lower portion 18, 19 in order that it cannot be readily removed or fall out during use. A portion of the intermediate member 23 remains exposed and extending beyond an intermediate end of the respective upper or lower portion 18, 19 for example, so that the other of the upper 18 and lower portion 19 which is not securely affixed may be fit over and frictionally engage with the exposed portion of the intermediate connector 23.

It is to be appreciated that the size of the whole body 10, and hence the upper and lower portions 18, 19 may vary in length and diameter, depending on the size of the bike to be supported. In general the length of the body 10 will be 20.32 cm to 35.56 cm (8.0 to 14.0 inches) in length and more preferably 25,4 cm to 30.48 cm (10.0 to 12.0 inches) in length and 0.254 cm to 1.27 cm (0.10 to 0.50 inches) in diameter, and more preferably measures 30.48 cm (12 inches) long and about 0.635 cm (0.25 inches) in diameter. The inner diameter of the upper and lower portions 18, 19 as well as the intermediate connector 23 may be of any specific diameter depending on the material used for manufacture to provide a wall thickness giving suitable tensile, compression and shear strength to the body 10 itself.

In one or more embodiments as shown in FIG. 5, the inner diameter of these elements may be sized to accommodate an elastic or spring element connecting the upper and lower portions 18, 19 of the body 10 as discussed in further detail below. This elastic element 37 may be a tensile spring, bungee or rubber elastic cord and fixed in a manner as known in the art in the hollow interior between the upper and lower portions 18, 19 of the support stand body 10 to provide an inherent bias of the upper and lower portions 18, 19 linearly and axially towards one another. Where a body 10 axis V is defined, and along which axis V the upper, lower and connector portions are coaxially aligned when supporting the bicycle, the elastic member provides an inherent bias which pulls the upper and lower portions 18, 19 of the body 10 towards one another along the axis V. The elastic member 37 is fixed to both the upper and lower portions 18, 19 in a manner which provides for the elastic member to be in tension, even when the upper and lower portions 18, 19 as well as intermediate connector 23 are telescopically joined in linear, axial alignment with one another. The elastic member 37 has a spring constant which is capable of being overcome by basic human manual force to pull apart the upper and lower portions 18, 19 so that the upper and lower portions 18, 19 may be detached from one another and folded in to substantially parallel alignment with one another for storage.

As seen in FIG. 3 the disassembled body 10 includes the receiver 15 at the first end 11 of the body 10 and the ground engaging member 17 attached at the second end 13 of the body 10 and the body 10 being in a disassembled state i.e. where the upper and lower portions 18, 19 are not linearly and frictionally connected with one another. As shown, the intermediate connector 23 is secured within the upper portion 18 and extends partially from an intermediate end of the upper portion 18. The intermediate end of the upper portion 18 forms a stop against which an intermediate end of the lower portion 19 abuts when the upper and lower portions 18, 19 are linearly aligned. The exposed part of the intermediate connector 23 essentially serves as a guide for receiving the lower portion 19 when a user aligns the upper and lower portions 18, 19 along axis V. As discussed above, the elastic element 37 is always in tension so as the user linearly aligns the upper and lower portions 18, 19, the biasing force of the elastic element 37 pulls the upper and lower portions 18, 19 together with the lower portion 19 being pulled essentially over and frictionally engaging the exposed part of the intermediate connector 23. The lower portion 19 is thus biased linearly along the body 10 axis V in this way until the respective intermediate ends of the upper and lower portions 18, 19 of the body 10 abut creating the assembled body 10 of the support stand 3. It is to be appreciated that the support stand 3 could be formed of additional portions, for example three (3) or more, which would facilitate folding of the support stand 3 into an even more compact stowable form. Alternatively the body 10 could also be formed of a single portion, i.e. a body 10 without any sort of separation into multiple portions.

In another embodiment of the present invention the stem 9 and receiver 15 parts could be reversed, for example the tab 5 supporting the receiver 15 structure with the body 10 having a stem 9 for insertion into the receiver 15. Other types of connection structures may also be contemplated, however the simple receiver 15 and securing magnet element 24 as described above provide a secure, efficient and relatively easy manual operation for using the support stand 3.

The invention has been described in detail with particular reference to certain preferred embodiments thereof, but it will be understood that variations and modifications can be effected within the spirit and scope of the invention.

I claim:

1. A support stand for a wheeled vehicle comprising:
    a tab having a stem extending from an axle surround for connection about a rotational axis of a wheel;
    an elongate body comprising:
    an upper portion separably connectable and disconnectable from a lower portion;
    a receiver connected to the upper portion of the elongate body defining a cavity for receiving the stem of the tab, the receiver having a first end and a magnetic element situated within the cavity;
    an attached state wherein the tab is connected about the rotational axis of a wheel and the upper and lower portions of the elongate body are connected and the stem of the tab is received and magnetically attracted to the magnetic element to secure and axially pull the stem of the tab into the cavity of the receiver; and
    a detached state wherein the stem of the tab is withdrawn from the cavity of the receiver and the wheeled vehicle is not supported by the support stand.

2. The support stand for a wheeled vehicle as set forth in claim 1 wherein the tab further comprises an angle formed between a face plane of the axle surround and a longitudinal axis of the stem.

3. The support stand for a wheeled vehicle as set forth in claim 2 wherein the tab is fabricated from a ferromagnetic material.

4. The support stand for a wheeled vehicle as set forth in claim 1 wherein the upper and lower portions of the elongate body are joined by an elastic member biasing the upper and lower portions axially together along a common axis.

5. The support stand for a wheeled vehicle as set forth in claim 1 wherein the tab is supported substantially around and axially along a rear wheel rotational axis of the vehicle.

6. A support stand for a wheeled vehicle comprising:
    a tab having an axle surround and a stem extending from the axle surround for connection about a rotational axis of a wheel;
    an elongate body comprising:
    an upper portion separably connectable and disconnectable from a lower portion;
    a connection element on the upper portion of the elongate body for connecting to the tab, the connection element having a magnetic element affixed inside a cavity of the connection element;
    an attached state wherein the tab is connected about the rotational axis of a wheelband and the upper and lower portions of the elongate body are securely connected to the stem of the tab by axially pulling the stem of the tab into the cavity using the magnetic element to have the connection element support the wheeled vehicle; and a detached state wherein the body is detached from the tab and the wheeled vehicle is not supported by the support stand.

7. The support stand for a wheeled vehicle as set forth in claim 6 wherein one of the tab and the elongate body includes a receiver having the cavity for receiving the stem as a mating element on the other of the tab and elongate body.

8. The support stand for a wheeled vehicle as set forth in claim 7 wherein the tab further comprises an angle formed between a face plane of the axle surround and a longitudinal axis of the stem.

9. The support stand for a wheeled vehicle as set forth in claim 8 wherein the tab is fabricated from a ferromagnetic material and a magnetic element helps secure the tab to elongate body.

10. The support stand for a wheeled vehicle as set forth in claim 7 wherein the upper and lower portions of the elongate body are joined by an elastic member biasing the upper and lower portions axially together along a common axis.

11. The support stand for a wheeled vehicle as set forth in claim 6 wherein the tab is supported substantially around and axially along a rear wheel rotational axis of the vehicle.

12. The support stand for a wheeled vehicle as set forth in claim 11 wherein the elongate body includes a receiver having the cavity for receiving the stem of the tab.

13. A method of supporting a wheeled vehicle comprising the steps of:

fabricating a tab having a stem extending from an axle surround for connection about a rotational axis of a wheel;

providing an elongate body having an upper portion separably connectable and disconnectable from a lower portion and a connection element on the upper portion of the elongate body for connecting to the tab; the connection element having a magnetic element affixed inside a cavity of the connection element at a depth equal to the length of the stem;

connecting the tab about the rotational axis of a wheel in an attached state and connecting the upper and lower portions of the elongate body to the stem of the tab by axially pulling the stem of the tab into the cavity using the magnetic element to have the connection element support the wheeled vehicle; and defining a detached state wherein the body is detached from the tab and the wheeled vehicle is not supported by the support stand.

14. The support stand for a wheeled vehicle as set forth in claim 1 wherein the tab further comprises striations to prevent rotation of the tab about the rotational axis of a wheel.

* * * * *